J. C. GRANT.
DOUGH RAISER.
APPLICATION FILED DEC. 1, 1909.
969,533.
Patented Sept. 6, 1910.
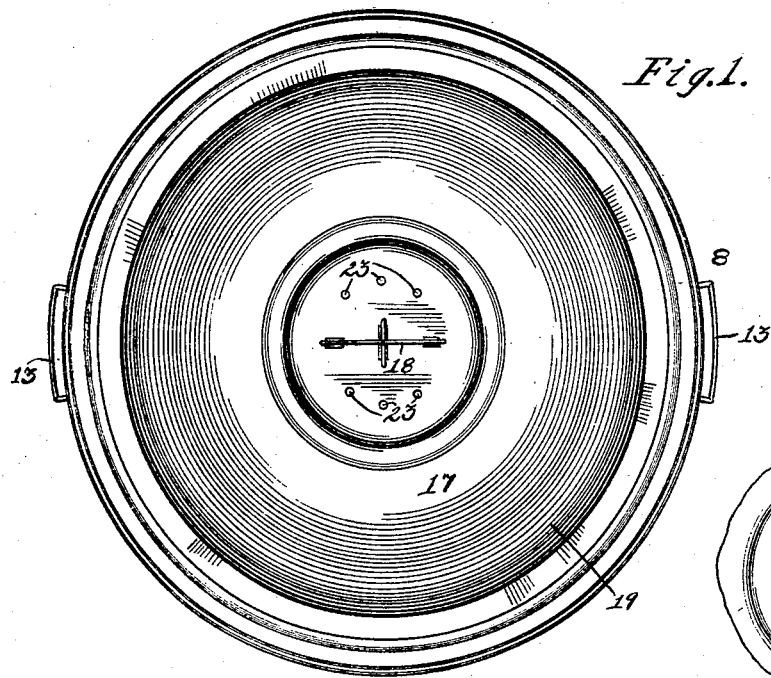
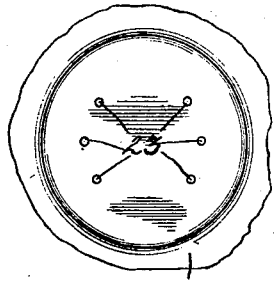
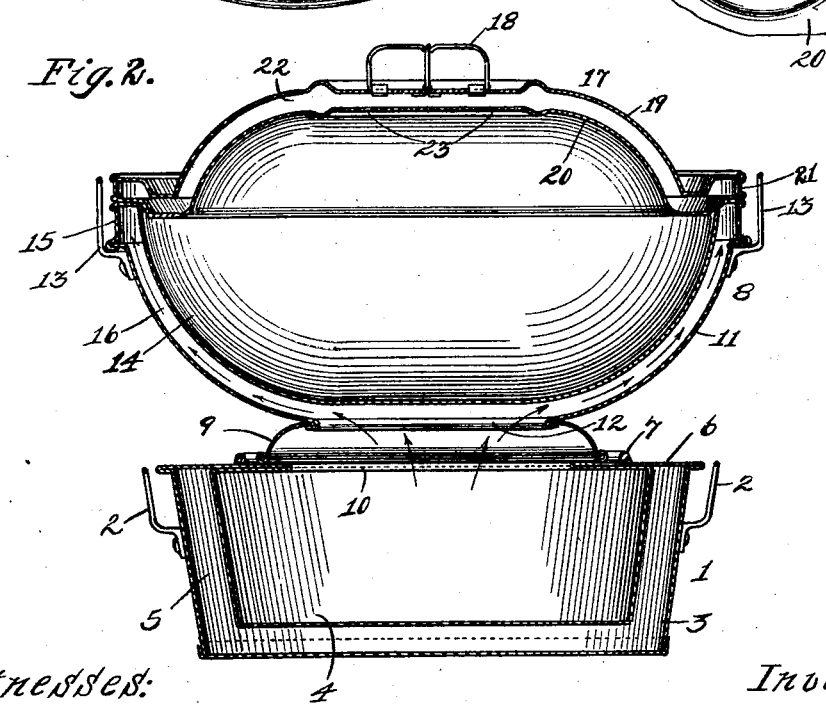
Witnesses:
C. E. Wessels.
A. A. Olson.
Inventor:
Joseph C. Grant,
By Joshua R H Potts
his Attorney.

UNITED STATES PATENT OFFICE.

JOSEPH C. GRANT, OF AKRON, OHIO.

DOUGH-RAISER.

969,533.  Specification of Letters Patent.  Patented Sept. 6, 1910.

Application filed December 1, 1909. Serial No. 530,830.

*To all whom it may concern:*

Be it known that I, JOSEPH C. GRANT, a citizen of the United States, residing at Akron, county of Summit, and State of Ohio, have invented certain new and useful Improvements in Dough-Raisers, of which the following is a specification.

My invention relates to dough raisers and the object of my invention is the provision of a device of such character which will be so designed as to render the same applicable to effect the uniform and proper heating of dough preparatory to the baking thereof.

A further object is the provision of a dough raiser which will be adapted to retain the heat of the heating medium employed therein, and for a comparatively great length of time or for such a space of time as is requisite to effect the proper raising or fermentation of the dough contained therein.

A still further object is the provision of a dough raiser as mentioned, the employment of which will greatly facilitate the making of bread, and will reduce to an appreciable extent the length of time ordinarily assumed in the process of bread making; another object being to provide a dough raiser which will be strong, durable and comparatively simple of construction.

Other objects will appear hereinafter.

With these objects in view my invention consists in a dough raiser characterized as above mentioned and in certain details of construction and arrangement of parts all as will be hereinafter fully described and particularly pointed out in the appended claims.

My invention will be best understood by reference to the accompanying drawings forming a part of this specification, and in which, Figure 1 is a top plan view of my device in its preferred form, Fig. 2 is a central vertical section thereof, and Fig. 3 is a fragmentary detail of the cover embodied in the device.

Referring now to the drawings, 1 indicates a substantially cylindrical comparatively shallow base vessel, the same being provided with suitable diametrically opposed handles 2. Said vessel is comprised of similar outer and inner pans or walls 3 and 4 respectively, the latter being of dimensions considerably less than those of the former, and whereby an air chamber or jacket 5 is formed between the adjacent surfaces of said walls. The upper extremity of the chamber 5 is closed or sealed by an annular top plate 6 formed preferably integrally with the walls 3 and 4. Said plate preferably projects as shown inwardly from the upper edge of the pan 4 and is provided upon its upper surface with a concentrically positioned ridge 7.

Removably arranged upon the vessel 1, the same resting upon the plate 6 of the latter, is a substantially hemi-spherical receptacle 8. The flaring base 9 of the latter is of such diameter as to adapt the same to fit within the ridge 7, as shown in Fig. 2, the latter thereby evidently serving as means for centering the same over the opening 10 in the top of the vessel 1, and also as a seat whereby accidental displacement thereof from said vessel is prevented. Comprised in the receptacle vessel is an outer casing or wall 11 provided in its under side with a central opening 12 registering with the base portion 9, and adjacent its upper edge with diametrically opposed handles 13. Centrally arranged within said casing or wall 11, is a similarly formed imperforate inner wall 14, the same being elevated slightly from the former by means of a depending peripheral flange 15 preferably formed upon the part 14, said flange being rigidly secured, preferably by solder at its lower edge to the upper edge of the wall 11. By such arrangement it is observed that a chamber 16 closed at its upper extremity and communicating at its lower end with the opening 12 is formed about the inner part or wall 14.

The receptacle 8 is provided with a snugly fitting substantially hemi-spherical cover 17 which is furnished centrally at its upper side with a suitable handle 18. Said cover also is formed of two similar walls 19 and 20 spaced apart and rigidly secured together at their peripheries by an annular spacing 21, whereby an air space 22 is formed therein. Said cover parts 19 and 20 are each provided with a series of perforations 23 to permit of the escape of the gases driven off in the process of fermentation.

In using my device, water or any other suitable liquid at substantially the boiling point is introduced into the vessel 1. The receptacle 8 containing the dough or ingredients thereof to be fermented, with the cover 17 arranged thereon, is then arranged upon the vessel 1 in the manner shown and above described. Heated vapor will now arise from the vessel 1, the same passing through the opening 12 into the chamber 16, as indicated by arrows in Fig. 2, and into contact with the adjacent surfaces of the walls 11 and 14. Said vapor upon the contact thereof with said surfaces is condensed. Such condensation drips down said surfaces and is again deposited in the vessel 1. Hence it will be seen that during the operation of the device, the entire container part 14 of the receptacle 8 will be enveloped in a jacket of heated vapor, and whereby the former will be heated sufficiently to effect the proper fermentation of the dough contained therein.

By forming the walls of the vessel 1 with an intermediate air space or jacket as shown and described, an effectual insulator or non-heat conductor is embodied therein whereby the heat of the liquid introduced into the former will not be readily lost by radiation, and whereby consequently said liquid will be kept at a high temperature for a considerable length of time. Also by forming the cover 17 with a similar air space between the comprising parts thereof, the heat generator in the containing compartment of the receptacle below, will for the same reason be preserved and utilized to its fullest extent.

With the provision of a device of a construction as shown and described one of the highest possible efficiency both in operation and construction will be provided.

While I have shown what I deem to be the preferable form of my device I do not wish to be limited thereto as there might be various changes made in the details of construction and the arrangement of parts without departing from the spirit of the invention comprehended within the scope of the appended claims. And although I have designed my device with special reference to bread making the same may be used in any other connection to which it is applicable.

Having described my invention what I claim as new and desire to secure by Letters Patent is:

1. A dough raiser comprising a lower vessel having walls formed of a non-heat-conducting substance, said vessel being provided with an opening in its upper side, a double walled receptacle arranged upon said lower vessel, the walls of said receptacle being spaced apart to form an air chamber between the same, said chamber communicating with an opening in the under side of the outer wall of said receptacle, said opening registering with the opening in said lower vessel, and a cover for said receptacle, substantially as described.

2. A dough raiser comprising a lower vessel having non-heat conducting walls, said vessel being provided with an opening in its upper side, a double walled receptacle arranged upon said lower vessel, the walls of said receptacle being spaced apart to form an air chamber between the same, said chamber communicating only with an opening in the under side of the outer wall of said receptacle, said opening registering with the opening in said lower vessel, and a cover for said receptacle having an air space formed therein, substantially as described.

3. A dough raiser comprising a lower double walled vessel, the walls of said vessel being spaced apart to form a closed air jacket between the same, said vessel being open at its upper side, a double walled receptacle arranged upon said lower vessel, the walls of said receptacle being spaced apart to form an air chamber between the same, said chamber communicating with an opening in the under side of the outer wall of said receptacle, said opening registering with the opening in said lower vessel, and a perforated cover for said receptacle, said cover being comprised of two spaced members, the latter forming an air space between them, substantially as described.

4. A dough raiser comprising a lower double walled vessel, the walls of said vessel being spaced to form a closed air jacket between the same, a stationary top for said vessel having a central opening therein, a double-walled receptacle arranged upon said lower vessel, a seat for said receptacle provided upon the top of said lower vessel, the walls of said receptacle being spaced apart to form an air chamber between the same, said chamber communicating only with an opening provided centrally in the under side of the outer wall of said receptacle, said opening being in registration with the opening in the top of said lower vessel, and a handled perforated cover for said receptacle, said cover being comprised of two spaced members forming an intermediate air space, substantially as described.

5. A dough raiser comprising a lower substantially cylindrical double walled vessel, handles for said vessel, the walls of said vessel being spaced apart to form a closed air jacket between the same, a stationary top for said vessel having a circular opening centrally provided therein, a double-walled substantially hemispherical receptacle arranged upon said lower vessel, handles for said receptacle, an annular ridge provided upon said top of said lower vessel for holding said receptacle centrally over the opening in said vessel, the walls of said receptacle being spaced apart to form a coextensive air chamber between the same, said chamber communicating only with an opening provided centrally in the under side of the outer wall of said receptacle, a handled snugly fitting substantially hemispherical cover for said receptacle, said cover being comprised of two spaced members forming an intermediate air space, the said cover being provided with a series of openings centrally positioned therein, substantially as described.

In testimony whereof I have signed my name to this specification in the presence of two subscribing witnesses.

JOSEPH C. GRANT.

Witnesses:
 CLEO F. SNOOK,
 ELTA KOPLIN.